United States Patent [19]

Comer et al.

[11] Patent Number: 5,232,963

[45] Date of Patent: Aug. 3, 1993

[54] DISPERSING GUMS IN HYDROCARBON STREAMS WITH ALPHA-OLEFIN/MALEIC ANHYDRIDE COPOLYMER

[75] Inventors: David G. Comer; Sherri L. Fisher, both of Sugar Land, Tex.; Rosemarie Palmer-Sungail, Venetia, Pa.

[73] Assignee: Nalco Chemical Company, Naperville, Ill.

[21] Appl. No.: 911,231

[22] Filed: Jul. 9, 1992

[51] Int. Cl.$^5$ .............................................. C08L 33/06
[52] U.S. Cl. ..................................... 524/55; 524/517; 524/549
[58] Field of Search ......................... 524/55, 517, 549

[56] References Cited

U.S. PATENT DOCUMENTS

| | | | |
|---|---|---|---|
| 3,231,498 | 1/1966 | de Vries | 528/486 |
| 3,511,780 | 5/1970 | Neblett et al. | 558/87 |
| 3,523,768 | 8/1970 | Mehmedbasich | 44/393 |
| 3,531,440 | 9/1970 | Mehmedbasich | 525/327.9 |
| 3,560,455 | 2/1971 | Hazen et al. | 524/549 |
| 3,560,456 | 2/1971 | Hazen et al. | 524/549 |
| 3,560,457 | 2/1971 | Hazen et al. | 524/549 |
| 3,694,176 | 9/1972 | Miller | 44/393 |
| 4,151,069 | 4/1979 | Rossi | 208/33 |
| 4,161,452 | 7/1979 | Stambaugh et al. | 525/285 |
| 4,240,916 | 12/1980 | Rossi | 252/568 |
| 4,359,325 | 11/1982 | Dawans et al. | 524/549 |
| 4,416,668 | 11/1983 | Thompson | 44/346 |
| 4,489,194 | 12/1984 | Hayashi | 525/193 |
| 4,548,725 | 10/1985 | Bridger | 252/568 |
| 4,919,683 | 4/1990 | Nalesnik et al. | 144/347 |
| 5,073,248 | 12/1991 | Stephenson et al. | 524/64 |
| 5,100,531 | 3/1992 | Stephenson et al. | 524/484 |
| 5,143,594 | 9/1992 | Stephenson et al. | 524/64 |

FOREIGN PATENT DOCUMENTS

| | | |
|---|---|---|
| 1208423 | 7/1986 | Canada . |
| 263704 | 4/1988 | European Pat. Off. . |
| 302643 | 2/1989 | European Pat. Off. . |
| 306290 | 3/1989 | European Pat. Off. . |
| 307815 | 3/1989 | European Pat. Off. . |
| 343981 | 11/1989 | European Pat. Off. . |
| 356256 | 2/1990 | European Pat. Off. . |
| 360419 | 3/1990 | European Pat. Off. . |
| 382450 | 8/1990 | European Pat. Off. . |
| 2330232 | 1/1974 | Fed. Rep. of Germany . |
| 2446829 | 4/1975 | Fed. Rep. of Germany . |
| 2451047 | 5/1975 | Fed. Rep. of Germany . |
| 2627785 | 1/1977 | Fed. Rep. of Germany . |
| 3730885 | 3/1989 | Fed. Rep. of Germany . |
| 2535723 | 5/1984 | France . |
| 56-065091 | 6/1981 | Japan . |
| 56-167791 | 12/1981 | Japan . |
| 58-222190 | 12/1983 | Japan . |
| 59-008790 | 1/1984 | Japan . |
| 61-016989 | 1/1986 | Japan . |
| 61-296090 | 12/1986 | Japan . |
| 62-018494 | 1/1987 | Japan . |
| 62-236893 | 10/1987 | Japan . |
| 1-318083 | 12/1989 | Japan . |
| WO83/03615 | 10/1983 | PCT Int'l Appl. . |

OTHER PUBLICATIONS

Naga, Abou El, et al. *Journal of Chemical Technology.*, 35A(5), 1985, pp. 241-247. (abstract).

Andress, H. J., *Journal of the American Chemical Society*, 18(4), 1973, pp. 687-692. (abstract).

*Primary Examiner*—Paul R. Michl
*Assistant Examiner*—Olga Asinovsky
*Attorney, Agent, or Firm*—Robert A. Miller; Daniel N. Lundeen; Andrew S. Pryzant

[57] ABSTRACT

A method is disclosed for dispersing gums in hydrocarbon streams, particularly low molecular weight, sticky polymeric materials formed in refinery and petrochemical plant operation. The dispersant comprises a free radically polymerized copolymer of an α-olefin of from about 10 to about 36 carbon atoms and maleic anhydride wherein the anhydride moieties along the copolymer backbone are substantially unhydrolyzed. The copolymer has a ratio of α-olefin to maleic anhydride of from about 1 to about 0.5 and a molecular weight of from 5000 to about 100,000. The dispersant alternatively comprises a dispersant mixture wherein the first component comprises the α-olefin/maleic anhydride copolymer and the second component comprises an alkyl substituted phenol/formaldehyde liquid polymer, such as nonyl phenol/formaldehyde polymer, or a lipophilic/hydrophilic vinylic polymer, such as hydroxyethyl methacrylate/lauryl acrylate copolymer. Also disclosed is a hydrocarbon dispersion made by the method.

28 Claims, No Drawings

DISPERSING GUMS IN HYDROCARBON STREAMS WITH ALPHA-OLEFIN/MALEIC ANHYDRIDE COPOLYMER

FIELD OF THE INVENTION

The present invention relates to dispersing low molecular weight polymeric gum materials present in gum-forming hydrocarbon streams with α-olefin/maleic anhydride copolymer additives.

BACKGROUND OF THE INVENTION

In the manufacture and finishing of organic chemicals and plastics, a wide variety of hydrocarbon streams have readily occurring residual components such as low molecular weight polymeric gums. Such gums are generally oligomeric byproducts of many chemical reactions, especially polymerization reactions, and can build up in reactant recycle streams of continuous operations. Unless the buildup of such materials is effectively prevented, they will accumulate and can cause fouling of equipment, especially heat exchangers and compressors, with concomitant operational difficulties.

Polymers comprising α-olefins and maleic anhydride are well known. Rossi U.S. Pat. No. 4,240,916 discloses an oil soluble copolymer composed of about equimolar amounts of 1-olefins and maleic anhydride useful as a lubricating oil pour point depressant wherein the 1-olefins are a mixture of $C_1$-$C_{14}$ and $C_{20}$-$C_{28}$ monomers. The pour point depressant activity is said to be enhanced by esterification of the copolymer with a $C_1$-$C_4$ alcohol.

Rossi U.S. Pat. No. 4,151,069 discloses olefin-dicarboxylic anhydride copolymers and their ester derivatives having $C_{18}$-$C_{50}$ linear alkyl side chains. The polymers and derivatives are said to be useful in amounts of up to 5 weight percent as filtration aids in low-temperature solvent dewaxing of waxy lubricating oils containing 5-30 weight percent wax.

Similarly, Miller U.S. Pat. No. 3,694,176, discloses polymers of ethylene and ethylenically unsaturated dicarboxylic acids, anhydrides or esters as wax crystal modifiers, pour point depressants and dewaxing aids in petroleum oil.

Rossi U.S. patent application, Ser. No. 515,562, filed Oct. 17, 1974, abandoned, discloses that partial alkyl ester-partial amide derivatives of low molecular weight maleic anhydride/1-olefin copolymers are useful in mineral oil lubricants as pour point depressants, viscosity index improvers and sludge inhibitors.

Japanese Kokai 62-018,494 discloses low temperature flow improvers for fuel oils which are copolymers of a $C_{20}$-$C_{28}$ α-olefins and maleic anhydride.

Hazan et al. U.S. Pat. No. 3,560,456 discloses a process for making a copolymer of maleic anhydride and an aliphatic olefin having from 16-18 carbon atoms in the presence of a free radical catalyst and a solvent. The copolymer is precipitated from solution using n-propanol or isopropanol.

de Vries U.S. Pat. No. 3,231,458 discloses a high molecular weight copolymer of olefins of from about 2 to about 20 carbon atoms and diolefins of from about 5 to about 20 carbon atoms reacted with maleic anhydride to form a succinic anhydride-substituted adduct said to have rust inhibiting, dispersing and thickening characteristics in liquid hydrocarbon compositions, such as fuels and lubricants.

Nalesik, et al. U.S. Pat. No. 4,919,683 discloses a stabilizer for a middle distillate fuel-oil which is an aromatic polyamine succinimide derivative of an ethylene/$C_3$-$C_{18}$ α-olefin copolymer grafted with maleic anhydride.

Gutierrez et al. U.S. Pat. No. 4,866,135 discloses a reaction product of a $C_5$-$C_9$ lactone adduct of a maleic anhydride grafted ethylene/$C_3$-$C_{28}$ α-olefin polymer with an N-containing heterocyclic aminoalkyl derivative. The polymeric lactone derivatives are said to be useful as dispersant additive for fuel and lubricating oils.

Bridger U.S. Pat. No. 4,548,725 discloses a lubricant additive said to reduce low temperature microcrystalline wax formation in hydro-dewaxed stock made by reacting an alcohol with a maleic anhydride-olefin copolymer.

Mehmedbasich et al. U.S. Pat. No. 3,531,440 discloses succinate ester modified polymers of $C_6$-$C_{18}$ α-olefins employed as dispersants in fuels.

SUMMARY OF THE INVENTION

It has been discovered that gum components in certain hydrocarbon streams can be effectively dispersed using a free-radically polymerized copolymer of an α-olefin and maleic anhydride. Such gum can otherwise precipitate in lines and equipment causing operational difficulties and/or excessive maintenance problems.

In one embodiment, the present invention provides a method for dispersing gum in a hydrocarbon stream. The method comprises the steps of determining the presence of gum in a hydrocarbon stream; and introducing an effective amount of a copolymer gum dispersant into the gum-containing hydrocarbon stream. The gum dispersant comprises a copolymer of an olefin having from about 10 to about 36 carbon atoms and maleic anhydride. The weight ratio of the olefin to the maleic anhydride in the copolymer is from about 1:1 to about 1:5. The molecular weight of the copolymer is from about 5,000 to about 100,000. The anhydride moieties of the copolymer are substantially unreacted, i.e. non-hydrolyzed. The hydrocarbon stream preferably comprises a naphtha, kerosene, gas oil or diesel stream. The hydrocarbon stream can also comprise an aliphatic or aromatic olefin stream. The dispersant can preferably be added to the hydrocarbon stream in a compressor uptake to inhibit compressor gum build-up. Alternatively, the dispersant can be added to the hydrocarbon stream upstream from a process heat exchanger to inhibit exchanger fouling. The copolymer dispersant preferably comprises an α-olefin having from about 24 to about 28 carbon atoms, a weight ratio of olefin to maleic anhydride of from about 1:1 to about 1:2, and a weight average molecular weight of from about 5000 to about 15,000.

As another aspect, the dispersant may comprise a mixture of two of more polymeric dispersants wherein a first dispersant comprises a copolymer of an α-olefin and maleic anhydride and a second dispersant includes an alkyl substituted phenol-formaldehyde liquid polymer and/or a hydrophilic-lipophilic vinylic polymer. The dispersant mixture preferably comprises from about 50 to about 100 parts by weight of the first dispersant and from 0 to about 50 parts by weight of the second dispersant. A preferred alkyl substituted phenol-formaldehyde liquid polymer comprises nonyl phenol/formaldehyde or t-butyl phenol/formaldehyde polymer. A preferred hydrophilic-lipophilic vinylic polymer comprises hydroxyethylmethacrylate/lauryl acrylate copolymer.

In another embodiment, the present invention provides a hydrocarbon dispersion. The dispersion comprises a hydrocarbon stream containing gum particles dispersed therein by an effective amount of a copolymer dispersant. The copolymer comprises an α-olefin having from about 10 to about 36 carbon atoms and maleic anhydride, wherein the weight ratio of the α-olefin to the maleic anhydride is from about 1:1 to about 1:5 and a molecular weight of the copolymer is from about 5,000 to about 100,000, the anhydride moieties of the copolymer are substantially unreacted, i.e. non-hydrolyzed. The α-olefin preferably has from about 24 to about 28 carbon toms. The copolymer preferably has a weight ratio of α-olefin to maleic anhydride of from about 1:1 to about 1:2 and a weight average molecular weight of from about 5000 to about 15,000.

As another aspect, the dispersion can comprise a mixture of two of more polymeric dispersants wherein a first dispersant comprises a copolymer of an α-olefin and maleic anhydride and a second dispersant includes an alkyl substituted phenol-formaldehyde liquid polymer and/or a hydrophilic-lipophilic vinylic polymer. The dispersant mixture preferably comprises from about 50 to about 100 parts by weight of the first dispersant and from 0 to about 50 parts by weight of the second dispersant. A preferred alkyl substituted phenol-formaldehyde liquid polymer comprises nonyl phenol/-formaldehyde or t-butyl phenol/formaldehyde polymer. A preferred hydrophilic-lipophilic vinylic polymer comprises hydroxyethylmethacrylate/lauryl acrylate copolymer.

DETAILED DESCRIPTION OF THE INVENTION

The dispersant of the present invention comprises an as-polymerized copolymer of an α-olefin and maleic anhydride wherein the anhydride moieties along the polymer backbone are preferably substantially intact and not converted into a di-acid or any other anhydride reaction products. In contrast to other uses for polymeric maleic anhydride derivatives wherein the anhydride must generally be converted to an ester or amide derivative, it has been found, quite surprisingly that the copolymer of an α-olefin and maleic anhydride, essentially free of such derivative ester and amide moieties, is very effective in dispersing gum in a hydrocarbon stream.

Suitable olefin monomers have from about 10 to about 36 carbon atoms, preferably from about 18 to about 28 carbon atoms, and most preferably from 24 to about 28 carbon atoms. Examples of such α-olefins include 1-tetradecene, 1-hexadecene, 1-octadecene, 1-eicosene, 1-docosene, 1-tetracosene, 1-heptacosene, 1-triacontene, 1-hexatriacontene, and the like.

Maleic anhydride is a preferred α,β-ethylenically unsaturated anhydride. The maleic anhydride should preferably be essentially free of maleic acid contamination.

The copolymer dispersant suitable for use in the present invention has a molar ratio of maleic anhydride to α-olefin of from about 1 to about 5, preferably from about 1 to about 2, and most preferably 1 to about 1.5. Copolymers typically have a molecular weight from about 5000 to about 100,000. preferably from 5000 to about 25,000, and more preferably from about 5000 to about 15,000. The copolymer dispersant is preferably substantially free of hydrolyzed anhydride moieties or an other anhydride reaction products.

The α-olefin/maleic anhydride copolymer dispersant is generally suitable for use in any gum-forming hydrocarbon stream including refinery streams, light hydrocarbon plants streams, olefin plant streams and petrochemical or petrochemical derivative streams which can undergo gum-forming reactions (e.g. oligomerization) to produce an adhesive gum-like solid. Such gum solids can potentially precipitate at a relatively low pressure and high temperature and stick onto the walls and other surfaces of the process equipment.

Gums generally include the adhesive oligomeric products of gum-forming (e.g. polymerizable) hydrocarbon and hydrocarbon derivative streams, and generally have a molecular weight of from about 50 to about 100,000. Gums are usually oxidized products formed from hydrocarbons which are not stabilized with antioxidants. They typically contain heteroatoms such as oxygen, nitrogen, or sulfur, which confer polarity. Specific examples of gum-forming refinery streams include streams containing naphtha, kerosene, diesel, gas oil, and the like. Specific examples of gum-forming light hydrocarbon or olefin plant streams include streams containing ethane, propane, n-butane, isobutane, and the like. Examples of gum-forming petrochemical streams and derivatives thereof are gaseous, liquid or hydrocarbon solutions of aliphatic or aromatic olefinically unsaturated materials, particularly $C_2$–$C_5$ olefins and vinyl compounds such as ethylene, propylene, isobutylene, butadiene, isoprene, vinyl chloride, vinyl alcohol, vinyl acetate, and the like. Other examples of olefinically unsaturated materials include styrene, vinyl benzene, acrylic acid, ethylene terephthlate, maleic anhydride, and the like.

The present invention is generally applicable to gum-forming hydrocarbons and mixtures found, for example, in various refinery units such as hydrodesulfurizers, reformers, hydrocrackers, and recovery units such as depropanizers and debutanizers; petrochemical units such as monomer plants, e.g. for styrene and butadiene, polymer production facilities, e.g. for polybutadiene and polyethylene; petrochemical derivative units such as alkylation units; and the like. Using the present invention, gum formation can be inhibited in hydrocarbons in process equipment including, for example, coolers, heat exchangers and reboilers, compressors. distillation towers (e.g. deethanizers, depropanizers, debutanizers, depentanizers, etc.), solvent extraction towers, and the like.

The present dispersant is typically added to a continuous process stream at a point of relatively low pressure to achieve a desired equilibrium concentration throughout the process. In any process requiring compression of gaseous reactants such as, for example, the production of ethylene, propylene, polyethylene, and the like, the point of addition is preferably upstream of the compressor uptake. In processes where gaseous and liquid reactants, products and/or solvents are heated or cooled, e.g. in recovery operations for recycle and reuse following product finishing steps, the present dispersant is preferably added upstream of heat exchangers or coolers.

The present dispersant can be used as a continuous additive in the hydrocarbon stream or can be added periodically to facilitate gum removal from the process equipment.

Dispersions of gum materials in polymerizable hydrocarbon streams are produced by admixing an effective amount of the copolymer dispersant into the hydrocarbon stream. The dispersant is effective at dispersing oligomeric gums in the treated organic phase so as to prevent or inhibit build-up of gum deposits in equipment designed for handling, pumping, compressing, heating, cooling and reacting these hydrocarbon streams. The dispersant is used in a concentration of from about 0.1 to about 2000 parts per million of the hydrocarbon stream, preferably from about 0.5 to about 1000 parts per million, more preferably from about 1 to about 10 parts per million, and especially from about 1 to about 5 parts per million. Dispersions may be achieved at a stream temperature as low as about $-10°$ C. up to about 500° C., but preferably from about 0° C. to about 400° C.

In the practice of the present invention the dispersant can be a mixture of the α-olefin/maleic anhydride copolymer and a second dispersant comprising an alkyl phenol/formaldehyde liquid polymer and/or a lipophilic-hydrophilic vinylic polymer.

Preferred alkyl phenol/formaldehyde liquid polymers are those resins which are derived from $C_8$ to $C_{12}$ linear or branched alkyl radicals attached to the phenol ring at either the para or ortho positions (or both). The weight average molecular weight ranges from about 1000 to about 20,000, preferably from about 2000 to about 12,000. An example dispersant of this type is a liquid polymer of nonyl phenol condensed with formaldehyde at about a 1:1 mole ratio and having a weight average molecular weight of from about 2000 to about 5000.

Lipophilic-hydrophilic vinylic polymers are low molecular weight vinyl copolymers prepared by copolymerizing a lipophilic monomer with a hydrophilic monomer. Preferred lipophilic monomers comprise an ester of acrylic or methacrylic acid and a fatty alcohol having from 4 to about 24 carbon atoms. An example of a lipophilic monomer is lauryl acrylate. Preferred hydrophilic monomers are acrylic acid or methacrylic acid their salts and esters with polar groups such as non-fatty alcohols, amines, and the like. An example of a hydrophilic monomer is hydroxyethyl methacrylate. The lipophilic-hydrophilic vinylic polymers may comprise from about 10 to about 90 percent by weight of the lipophilic monomer and from about 10 to about 90 percent by weight of the hydrophilic monomer. Weight average molecular weight may range from 5000 to about 250,000, preferably from 10,000 to about 150,000. An example of a preferred lipophilic-hydrophilic vinyl polymer is a lauryl acrylate/hydroxyethyl methacrylate copolymer. For greater details regarding both alkyl phenol/formaldehyde and lipophilic/hydrophilic polymers and their preparation, see Stephenson U.S. Pat. No. 5,021,498 which is hereby incorporated herein by reference.

In a mixed dispersant, the α-olefin/maleic anhydride copolymer comprises from about 50 to about 90 percent of the dispersant mixture and the additional dispersant(s) comprises from 10 to about 50 percent of the dispersant mixture.

The α-olefin/maleic anhydride copolymer is preferably prepared by a neat free radical polymerization of the maleic anhydride and the α-olefin. Such polymerizations are known in the art. The copolymerization can be initiated by any free radical producing compound. Example include peroxides, azo, and the like initiators well known in the art. A preferred initiator is t-butyl perbenzoate. It is known that free radical polymerizations of the α-olefin and maleic anhydride are essentially alternating linear chains of the component monomers. This is different from polymer manufacture via the "ene" reaction wherein an olefin main chain is formed with the maleic anhydride grafted to the chain terminal position.

The amount of initiator to employ depends largely on the reactivity of the initiator chosen at a given reaction temperature. Typically, the initiator concentration is between about 0.001 to about 0.20 moles initiator per mole of maleic anhydride monomer, preferably 0.05 to about 0.10 moles initiator per mole anhydride.

The polymerization temperature may vary between about 20° C. to about 200° C. depending upon the initiator used and the desired properties of the copolymer product. We have found that a polymerization temperature of from about 125° C. to about 175° C. to be preferred. The polymerization pressure may vary from under a partial vacuum up to several thousand psi. Atmospheric pressure to about 100 psi is preferred for lower equipment costs and ease of manufacture.

Suitable reaction time is usually sufficient time to substantially completely react the available maleic anhydride. Reaction time is typically from about 1 to about 24 hours.

The reaction medium should be a liquid at the temperature and pressure of the copolymerization reaction. Suitable solvents which can optionally be employed include liquid saturated and aromatic hydrocarbons having from about 6 to about 20 carbon atoms, halogenated hydrocarbons having from about 1 to about 5 carbon atoms and ketones having from about 3 to about 6 carbon atoms. In the practice of the present invention, a neat polymerization reaction is conducted in the heated α-olefin comonomer. Otherwise, it is desirable that a separate reaction solvent be compatible with the end use hydrocarbon stream.

The present invention is further illustrated by way of the following examples.

EXAMPLE 1

An α-olefin/maleic anhydride copolymer was made in a batch reaction as follows: To a clean, dry, oxygen-free reactor vessel, 78.75 parts by weight (out of a total of 100) of $C_{28}$ α-olefin (1-octacocene) was added and heated using steam to 149° C. During the heating step, the reactor was purged using nitrogen to remove any water present in the monomer. Repeated monomer samples were analyzed for water content until the water concentration was shown to be 10 ppm or less. The nitrogen purge, however, was continued until all the initiator was added. Following the purging of any water present, 20.82 parts by weight acid-free maleic anhydride was metered into the reactor under agitation and the reactor was reheated to 149° C. Lastly, 0.428 parts by weight t-butyl perbenzoate initiator was metered into the reactor over a time period of 2-3 hours. The reaction temperature was allowed to rise to about 165.5° C. before cooling water was applied to the reaction vessel. The reaction temperature was maintained between 154° C. and 165.5° C. However, if the temperature exceeded 165.5° C., initiator addition was halted until the temperature dropped to 149° C., then initiator addition was continued. Following the addition of all the initiator, the reaction was continued for 15 minutes or until the viscosity of the solution was >1300 cp or the temperature fell below 149° C. The weight average molecular weight was estimated at between about 10,000 and 20,000.

EXAMPLES 2–12 and COMPARATIVE EXAMPLES 1–4

Dispersion tests were conducted on several different gum materials using the Example 1 α-olefin/maleic anhydride copolymer as a dispersing agent.

Gums tested were isolated from either a hydrocracking unit (Gum A) or a light cycle oil (Gum B) in a refinery. Gum samples were available as the residue of gum testing procedures performed at the plant stream in question according to ASTM D-381 and D-873.

A stock solution containing the gum sample was prepared by dissolving the solid gum (A or B) in toluene at a ratio of 1 part solid to 9 parts toluene.

A dispersant solution was prepared by dissolving sufficient copolymer (Example 1) in toluene to form a 5 percent solution (by weight). Other dispersant or additive compounds used were similarly dissolved in toluene. Table 1 lists the dispersant components.

TABLE 1

| Compound | Composition |
|---|---|
| A | nonyl phenol/formaldehyde polymer |
| B | lauryl acrylate/hydroxyethyl methacrylate copolymer |
| C | polyisobutylene succinate |
| D | polymethacrylate |

Tests were run by adding 250 μl of a stock solution to a graduated centrifuge tube containing an appropriate amount of dispersant solution diluted by 10 ml of hexane. After agitation for 60 seconds, the tube was allowed to settle for 2 hours. After settling, the volume of any solid material at the bottom of the tube was measured and compared to the volume of the settled material in a control sample of stock solution containing no dispersant. Percent dispersion for each test is presented in Table 2 as the percent difference of the volume of the non-dispersed material. Results indicate excellent dispersion activity using the α-olefin/maleic anhydride copolymer dispersant.

TABLE 2

| Example | Composition of Dispersant Additives (ppm) | | | | | Gum type | Percent dispersed |
| | Ex. 1 | Cpd. A | Cpd. B | Cpd. C | Cpd. D | | |
|---|---|---|---|---|---|---|---|
| 2 | 25 | — | — | — | — | Gum A | 95.4 |
| 3 | 50 | — | — | — | — | Gum A | 96.9 |
| Comp. 1 | — | 25 | — | — | — | Gum A | 23.6 |
| 4 | 7.5 | 17.5 | — | — | — | Gum A | 85.5 |
| 5 | 12.5 | 12.5 | — | — | — | Gum A | 89.1 |
| 6 | 17.5 | 7.5 | — | — | — | Gum A | 90.9 |
| 7 | 25 | — | — | — | — | Gum A | 90.9 |
| Comp. 2 | — | — | 25 | — | — | Gum A | 18.2 |
| 8 | 7.5 | — | 17.5 | — | — | Gum A | 74.5 |
| 9 | 12.5 | — | 12.5 | — | — | Gum A | 85.5 |
| 10 | 17.5 | — | 7.5 | — | — | Gum A | 90.9 |
| 11 | 25 | — | — | — | — | Gum A | 89.1 |
| 12 | 50 | — | — | — | — | Gum B | 60.0 |
| Comp. 3 | — | — | — | 30 | — | Gum B | 0.0 |
| Comp. 4 | — | — | — | — | 16.7 | Gum B | 0.0 |

EXAMPLES 13–24

Ethylene plant gums were isolated and dispersion tests were run as described in Examples 2–12 and Comparative Examples 1–4 except that the precipitate volume was measured after 30 or 60 minutes over a 2.5 hour period. At the end of 2 hours, the dispersion test sample was reshaken for an additional 10 seconds. The percent dispersed was calculated based on the precipitate volume of the blank.

Composition of the additional gums is given in Table 3.

TABLE 3

| Gum Type | Location |
|---|---|
| Gum C | Ethylene plant 1, compressor 2nd stage suction |
| Gum D | Ethylene plant 2, compressor 2nd stage suction |
| Gum E | Ethylene plant 2, compressor 3rd stage suction |

Results are given in Table 4.

TABLE 4

| Example | Ex. 1 (ppm) | Gum Type | % Dispersion over Blank | | | |
| | | | 30 min | 60 min | 120 min | 150 min |
|---|---|---|---|---|---|---|
| 13 | 100 | Gum C | 100 | 100 | 100 | 100 |
| 14 | 500 | Gum C | 100 | 100 | 100 | 100 |
| 15 | 1000 | Gum C | 100 | 100 | 100 | 100 |
| 16 | 1500 | Gum C | 100 | 100 | 100 | 100 |
| 17 | 100 | Gum D | 60 | 58.3 | 61.1 | 75 |
| 18 | 500 | Gum D | 65 | 63.9 | 66.7 | 100 |
| 19 | 1000 | Gum D | 100 | 100 | 100 | 100 |
| 20 | 1500 | Gum D | 100 | 100 | 100 | 100 |
| 21 | 100 | Gum E | 87.1 | 80 | 80 | 98 |
| 22 | 500 | Gum E | 100 | 100 | 100 | 100 |
| 23 | 1000 | Gum E | 100 | 100 | 100 | 100 |
| 24 | 1500 | Gum E | 100 | 100 | 100 | 100 |

EXAMPLES 25–26 and COMPARATIVE EXAMPLES 5–6

In the following examples and comparative examples, the dispersant of the present invention was tested in terms of heat exchanger fouling prevention in a lab scale process simulator. A 5 weight percent heptane solution of Gum C and a 10 weight percent solution of the Example 1 dispersant was made up as outlined in Examples 2–13 and Comparative Examples 1–4. The simulator had a central electrically heated rod having a jacket through which the gum-containing process fluid was pumped, a reservoir tank, a discharge tank and a process controller to maintain the process fluid at a specified outlet temperature by adjusting the temperature of the heating rod. Two runs were made using 125 ppm concentration of the Example 1 dispersant and two blank runs were made with no dispersant. In the four runs, the flow rate was 3 ml/min and the control temperature setpoint was 550° F. (287.8° C.). In the runs containing dispersant, the pressure was 590 psi (4.07

MPa) and in the blank runs, the pressure was 600 psi (4.14 MPa). Process temperature data were measured over the course of the runs (see Table 5) and afterwards, the heating rod was disassembled and observed for fouling due to the gum.

TABLE 5

| Example | Run Time (min) | Inlet Temp. (°C.) | Outlet Temp. (°C.) | Rod Temp. (°C.) |
|---|---|---|---|---|
| 25 | 0 | 51.1 | 291.1 | 426.7 |
|  | 5 | 48.3 | 289.4 | 406.7 |
|  | 10 | 45.6 | 289.4 | 399.4 |
|  | 15 | 46.7 | 286.7 | 395.5 |
|  | 20 | 47.2 | 287.8 | 398.9 |
|  | 25 | 46.1 | 288.3 | 398.9 |
|  | 30 | 46.7 | 287.8 | 401.7 |
|  | 35 | 46.7 | 287.8 | 398.9 |
|  | 40 | 45.6 | 287.8 | 401.7 |
|  | 45 | 46.7 | 288.9 | 401.7 |
|  | 50 | 46.7 | 287.8 | 400.6 |
|  | 55 | 46.7 | 287.8 | 402.8 |
|  | 60 | 46.1 | 287.8 | 401.7 |
|  | 65 | 46.1 | 287.2 | 401.1 |
|  | 70 | 46.1 | 288.3 | 401.1 |
|  | 75 | 46.1 | 287.8 | 402.2 |
|  | 80 | 46.1 | 287.2 | 402.2 |
|  | 85 | 46.1 | 288.3 | 401.1 |
|  | 90 | 46.1 | 287.8 | 402.8 |
| 26 | 0 | 40 | 287.8 | 428.3 |
|  | 5 | 40.6 | 287.8 | 406.7 |
|  | 10 | 41.1 | 288.9 | 394.4 |
|  | 15 | 41.1 | 287.8 | 401.1 |
|  | 20 | 41.7 | 288.3 | 401.1 |
|  | 25 | 41.1 | 287.2 | 401.7 |
|  | 30 | 41.1 | 288.9 | 401.1 |
|  | 35 | 41.1 | 288.9 | 404.4 |
|  | 40 | 41.1 | 287.2 | 402.2 |
|  | 45 | 41.1 | 287.8 | 406.7 |
|  | 50 | 41.1 | 288.3 | 403.3 |
|  | 55 | 41.1 | 287.8 | 406.1 |
|  | 60 | 41.1 | 288.3 | 407.8 |
|  | 65 | 41.1 | 287.2 | 405.6 |
|  | 70 | 41.1 | 287.2 | 405.6 |
|  | 75 | 41.1 | 288.3 | 406.1 |
|  | 80 | 41.1 | 287.2 | 406.1 |
|  | 85 | 41.1 | 288.3 | 407.8 |
|  | 90 | 41.1 | 287.2 | 405.6 |
| Comp. 5 | 0 | 46.7 | 287.2 | 470 |
|  | 5 | 47.2 | 288.3 | 418.9 |
|  | 10 | 47.8 | 288.3 | 420 |
|  | 15 | 47.2 | 287.2 | 421.1 |
|  | 20 | 47.2 | 288.3 | 424.4 |
|  | 25 | 46.7 | 289.4 | 426.1 |
|  | 30 | 46.1 | 288.9 | 429.4 |
|  | 35 | 45.6 | 288.9 | 428.3 |
|  | 40 | 46.1 | 287.8 | 425.6 |
|  | 45 | 45.6 | 288.3 | 427.8 |
|  | 50 | 46.1 | 287.8 | 427.2 |
|  | 55 | 45.6 | 288.3 | 427.2 |
|  | 60 | 45.6 | 287.8 | 428.9 |
|  | 65 | 45.6 | 288.9 | 432.2 |
|  | 70 | 45 | 288.9 | 431.1 |
|  | 75 | 45 | 288.9 | 427.8 |
|  | 80 | 45 | 286.7 | 428.4 |
|  | 85 | 44.4 | 289.4 | 433.3 |
|  | 90 | 45 | 287.8 | 428.9 |
| Comp. 6 | 0 | 43.3 | 286.7 | 511.7 |
|  | 5 | 42.2 | 288.3 | 450.6 |
|  | 10 | 41.7 | 288.3 | 454.4 |
|  | 15 | 40.6 | 287.8 | 456.1 |
|  | 20 | 40.6 | 287.8 | 455 |
|  | 25 | 40 | 288.9 | 458.9 |
|  | 30 | 40.6 | 287.8 | 460 |
|  | 35 | 41.1 | 287.8 | 463.3 |
|  | 40 | 41.7 | 288.3 | 458.3 |
|  | 45 | 41.7 | 287.8 | 462.8 |
|  | 50 | 41.1 | 287.8 | 464.4 |
|  | 55 | 41.7 | 288.9 | 468.9 |
|  | 60 | 41.7 | 288.9 | 466.7 |
|  | 65 | 40.1 | 288.3 | 470.6* |
|  | 70 | 40.1 | 288.3 | 474.4* |
|  | 75 | 40.1 | 288.3 | 463.3 |
|  | 80 | 42.2 | 288.3 | 465 |
|  | 85 | 41.7 | 288.3 | 466.1 |
|  | 90 | 42.2 | 288.3 | 467.8 |

*fluctuation due to process upset.

The heating rod was only lightly fouled when the present invention dispersant was used. This can be seen in the lower heating temperature required. Note, for example, the 90-minute DT's were only 115° C. and 118.6° C. for Examples 25 and 26 containing the dispersant, respectively, in contrast to Comparative Examples 5 and 6 which had respective 90-minute DT's of 141.1° C. and 179.5° C. In the blank runs, the heating rod was moderately fouled, and this is reflected in the higher rod temperature required to obtain the desired outlet temperature.

The foregoing description of the invention is illustrative and explanatory thereof. Various changes in the materials, apparatus, and particular parts employed will occur to those skilled in the art. It is intended that all such variations within the scope and spirit of the appended claims be embraced thereby.

What is claimed is:

1. A method for dispersing gum in a hydrocarbon stream, comprising the steps of:
   determining the presence of gum in a gum-containing hydrocarbon stream subject to gum formation; and
   introducing an effective amount of a dispersant into the gum-containing hydrocarbon stream, said dispersant comprising a copolymer of an α-olefin having from about 10 to about 36 carbon atoms and a maleic anhydride, wherein the weight ratio of said α-olefin to maleic anhydride is from about 1:1 to about 1:5 and the molecular weight of said copolymer is from about 5000 to about 100,000, said anhydride moieties of said copolymer being substantially intact, and wherein the gum comprises an adhesive, low molecular weight polymeric reaction product of the hydrocarbon.

2. The method of claim 1, wherein said gum comprises an adhesive oligomeric product of olefinically unsaturated aliphatic or aromatic compounds, said gum having a molecular, weight of from about 50 to about 100,000.

3. The method of claim 1, wherein said gum comprises an adhesive oligomeric product of naphtha, kerosene, diesel or gas oil, said gum having a molecular weight of from about 50 to about 100,000.

4. The method of claim 1, wherein said gum comprises an adhesive oligomeric product of ethane, propane, n-butane or isobutane, said gum having a molecular weight of from about 50 to about 100,000.

5. The method of claim 1, wherein said dispersant comprises from about 50 to about 90 parts by weight of said α-olefin/maleic anhydride copolymer and from 10 to about 50 parts by weight of an alkyl substituted phenol/formaldehyde liquid polymer or a hydrophilic/lipophilic vinylic liquid polymer.

6. The method of claim 5, wherein said alkyl substituted phenol/formaldehyde liquid polymer is selected from the group consisting of nonyl phenol/formaldehyde and t-butyl phenol/formaldehyde polymer.

7. The method of claim 5, wherein said hydrophilic/lipophilic vinylic liquid polymer comprises hydroxyethyl methacrylate/lauryl acrylate.

8. The method of claim 1, wherein said stream comprises from about 1 to about 100 parts per million of said copolymer dispersant.

9. The method of claim 1, wherein said α-olefin comprises from about 24 to about 28 carbon atoms.

10. The method of claim 1, wherein said weight ratio of said α-olefin to said maleic anhydride comprises from about 1:1 to about 1:2.

11. The method of claim 1, wherein said copolymer molecular weight comprises from about 5,000 to about 15,000.

12. The method of claim 1, wherein said copolymer is prepared by an as-polymerized free radical polymerization of said α-olefin and said maleic anhydride.

13. A hydrocarbon dispersion, comprising:
a gum forming hydrocarbon stream containing gum particles; and
an effective amount of a copolymer dispersant to disperse said gum particles therein, said copolymer comprising an α-olefin having from about 10 to about 36 carbon atoms and a maleic anhydride, wherein the weight ratio of said α-olefin to said maleic anhydride is from about 1:1 to about 1:5 and a molecular weight of said copolymer is from about 5,000 to about 100,000, said anhydride moieties of said copolymer being substantially intact, said anhydride moieties of said copolymer being substantially intact, and wherein the gum comprises an adhesive, low molecular weight polymeric reaction product of the hydrocarbon.

14. The dispersion of claim 13, wherein said gum comprises an adhesive oligomeric product of olefinically unsaturated aliphatic or aromatic compounds, said gum having a molecular weight of from about 50 to about 100,000.

15. The dispersion of claim 13, wherein said gum comprises an adhesive oligomeric product of naphtha, kerosene, diesel or gas oil, said gum having a molecular weight of from about 50 to about 100,000.

16. The dispersion of claim 13, wherein said gum comprises an adhesive oligomeric product of ethane, propane, n-butane or isobutane, said gum having a molecular weight of from about 50 to about 100,000.

17. The dispersion of claim 13, wherein said dispersant comprises from about 50 to about 90 parts by weight of said α-olefin/maleic anhydride copolymer and from 10 to about 50 parts by weight of an alkyl substituted phenol/formaldehyde liquid polymer or a hydrophilic/lipophilic vinylic liquid polymer.

18. The dispersion of claim 13, wherein said stream comprises from about 1 to about 1000 parts per million of said copolymer dispersant.

19. The dispersion of claim 13, wherein said α-olefin comprises from about 18 to about 28 carbon atoms.

20. The dispersion of claim 13, wherein said α-olefin comprises from about 24 to about 28 carbon atoms.

21. The dispersion of claim 13, wherein said weight ratio of said α-olefin to said maleic anhydride comprises from about 1:1 to about 1:2.

22. The dispersion of claim 13, wherein said copolymer molecular weight comprises from about 5,000 to about 50,000.

23. The dispersion of claim 13, wherein said copolymer molecular weight comprises from about 5,000 to about 15,000.

24. A method for dispersing gum in an olefin compressor, comprising the steps of
determining the presence of gum in a gum-containing olefin stream passing through a compressor, and
introducing a dispersant to the gum-containing olefin stream in an amount effective to substantially disperse the gum, said dispersant comprising a copolymer of an α-olefin having from about 10 to about 36 carbon atoms and a maleic anhydride, wherein the weight ratio of said α-olefin to said maleic anhydride is from about 1:1 to about 1:5 and molecular weight of said copolymer is from about 5000 to about 100,000, said anhydride moieties of said copolymer being substantially intact, and wherein the gum comprises an adhesive, low molecular weight polymeric reaction product of the olefin.

25. The method of claim 24, wherein said olefin stream comprises ethylene or propylene.

26. A method for dispersing gum in a forced convection heat exchanger, comprising the steps of:
determining the presence of gum related fouling in a hydrocarbon stream forced convection heat exchanger containing gum; and
introducing a dispersant to a gum-containing hydrocarbon stream in turbulent flow conditions upstream of said heat exchanger in an amount effective to inhibit fouling due to gum precipitation, said dispersant comprising a copolymer of an α-olefin having from about 10 to about 36 carbon atoms and a maleic anhydride, wherein the weight ratio of said α-olefin to said maleic anhydride is from about 1:1 to about 1:5 and molecular weight of said copolymer is from about 5000 to about 100,000, said anhydride moieties of said copolymer being substantially intact, and wherein the gum comprises an adhesive, low molecular weight polymeric reaction product of the hydrocarbon.

27. The method of claim 1, wherein the gum is determined to be present in a distillation tower.

28. The method of claim 27, wherein the hydrocarbon stream comprises styrene and vinyl benzene.

* * * * *